United States Patent [19]
Shaffer et al.

[11] 3,726,453
[45] Apr. 10, 1973

[54] EDGE-VENT DETECTOR

[75] Inventors: Gary W. Shaffer, Hyndman, Pa.; Lester R. Norris, Lonaconing; William H. Hutcheson, Cumberland, both of Md.

[73] Assignee: PPG Industries, Inc., Pittsburgh, Pa.

[22] Filed: Mar. 11, 1971

[21] Appl. No.: 123,300

[52] U.S. Cl. ..........................225/2, 83/371, 83/522, 225/96.5
[51] Int. Cl. ...............................................B26f 3/00
[58] Field of Search.......................83/371, 372, 522, 83/367, 209, 210, 211, 290, 167; 225/2, 96.5

[56] References Cited

UNITED STATES PATENTS

| | | | |
|---|---|---|---|
| 2,607,421 | 8/1952 | Anderson | 83/372 X |
| 2,834,156 | 5/1958 | Oberlin | 225/96.5 |
| 3,489,909 | 1/1970 | Martel | 225/96.5 X |
| 3,570,735 | 3/1971 | Kurz | 225/96.5 X |

Primary Examiner—Frank T. Yost
Attorney—Chisholm & Spencer

[57] ABSTRACT

In a process for making ground-and-polished plate glass, apparatus is provided, associated with a conveyor line for as-ground glass, prior to entry of same into a polishing line, for detecting edge vents in the glass. The apparatus comprises a carriage or frame spring-loaded or otherwise urged against the glass and having a follower wheel in contact with an edge thereof, with there being mounted on a frame a microswitch means having a contact member or roller in operative contact with the edge of the glass sheet or ribbon to be inspected. The microswitch is operatively connected to a means for indicating the presence of edge vents. The equipment preferably further comprises a cutter and a breaker means associated with a cullet chute, for removing from the process the pieces of glass that are detected as having faulty edges, to avoid unwanted breakage or damage in a subsequent polishing operation.

6 Claims, 2 Drawing Figures

PATENTED APR 10 1973  3,726,453
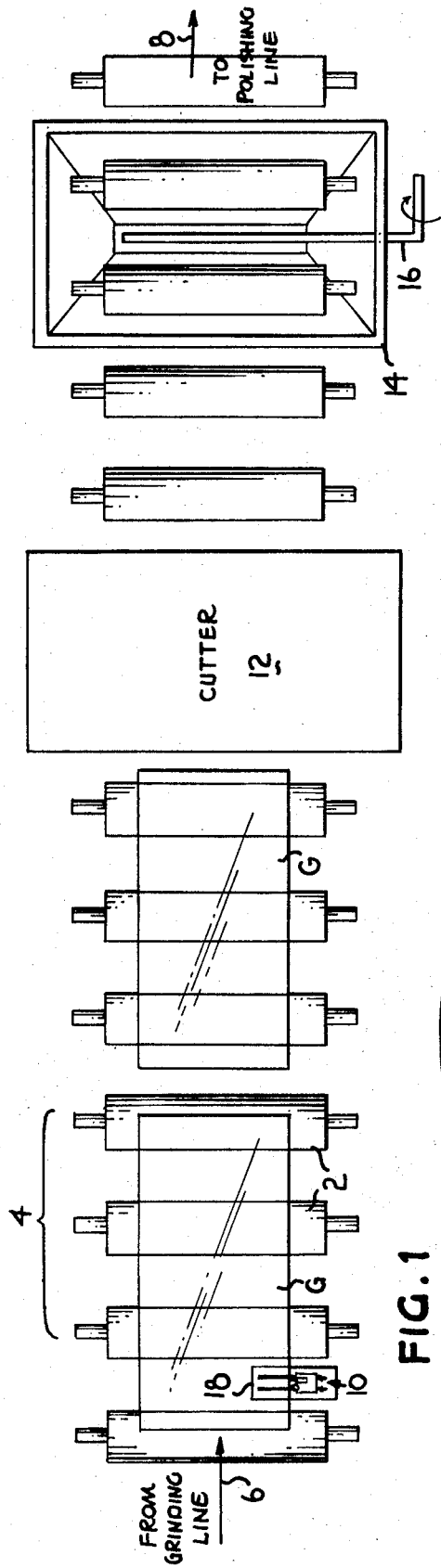
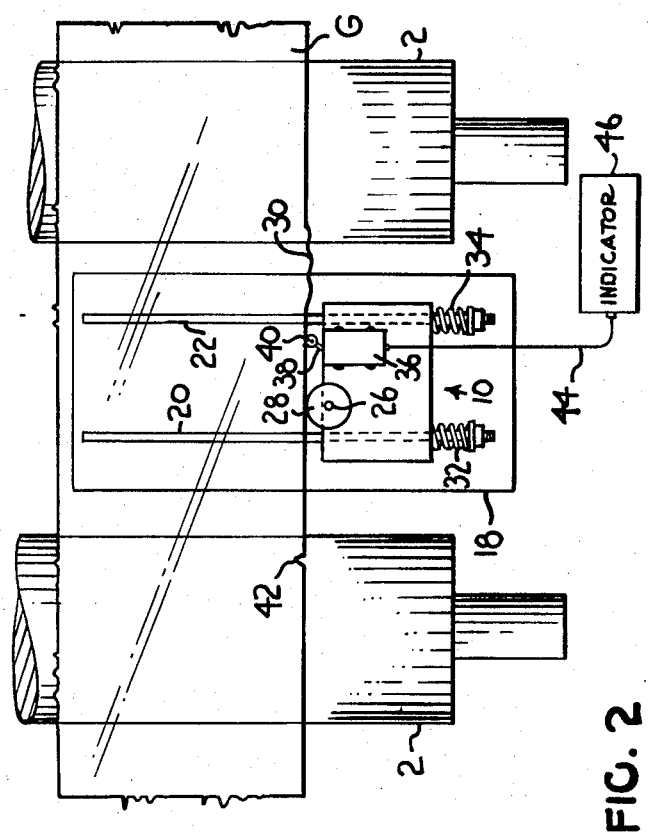
INVENTORS
GARY W. SHAFFER
WILLIAM H. HUTCHESON
LESTER R. NORRIS
BY Christen and Spencer
ATTORNEYS

EDGE-VENT DETECTOR

BACKGROUND OF THE INVENTION

This invention relates to apparatus for the manufacture of ground-and-polished plate glass, and in particular, to an apparatus useful, between the grinding and the polishing, for detecting the presence of edge-vent defects in the as-ground glass. In another aspect, the instant invention relates to a method for the production of ground-and-polished plate glass wherein difficulties caused by edge-vent defects are desirably avoided.

DESCRIPTION OF THE PRIOR ART

In the making of ground-and-polished plate glass, it has hereto been customary to rely upon visual inspection for the detection of edge-vent defects. If a sheet or ribbon of as-ground glass containing such edge-vent defects is permitted to pass into the subsequent polishing operation, breakage is likely to occur. When this happens, there is not only the loss of production that comes from the breakage of the as-ground glass, upon which considerable work has already been done, but also the economic detriment that the breakage may cause small particles of broken glass to become embedded within the felts of the polishing wheels, with the consequence that such felts must then be changed, to avoid having such particles scratch the glass. Although in many instances it is possible to obtain satisfactory results with mere visual inspection, it is apparent that the efficiency of the operation may be improved substantially if even relatively minor edge-vent defects may be detected with high reliability, an effect that is not to be obtained with mere visual inspection.

SUMMARY OF THE INVENTION

In a process for making ground-and-polished plate glass, apparatus is provided, associated with a conveyor line for as-ground glass, prior to entry of same into a polishing line, for detecting edge vents in the glass. The apparatus comprises a carriage or frame spring-loaded or otherwise urged against the glass and having mounted thereon a follower wheel in contact with an edge of the glass, with there also being mounted on the frame a microswitch means having a contact member or roller in operative contact with the edge of the glass sheet or ribbon to be inspected. The microswitch is operatively connected to a signal light or buzzer or other means for indicating the presence of edge vents. The equipment preferably further comprises a cutter and a breaker means associated with a cullet chute, for removing from the process the pieces of glass that are detected as having faulty edges, to avoid unwanted breakage or damage in a subsequent polishing operation.

DESCRIPTION OF THE DRAWING

A complete understanding of the instant invention may be obtained from the foregoing, and following description thereof, taken together with the appended drawing, in which:

FIG. 1 is a schematic plan view of a portion of a grinding-and-polishing line, containing apparatus in accordance with the instant invention, and FIG. 2 is an enlarged view of a portion of the apparatus depicted in FIG. 1.

DESCRIPTION OF THE PREFERRED EMBODIMENT

Referring to FIG. 1, sheets of glass G are shown as being conveyed by means of a plurality of rolls 2 comprising a conveyor 4. As is indicated by the arrows 6 and 8, the glass sheets G pass from a grinding line and through the equipment schematically depicted to a polishing line. Indicated generally at 10 is an edge-vent detector means in accordance with the instant invention. Downstream of said edge-vent detector means 10 there is preferably provided a cutter 12, which may, for example, be of the general kind indicated in U.S. Pat. No. 3,487,735 or U.S. Pat. No. 3,107,834. The cutter 12 is capable of scoring and snapping the glass sheets G transversely of their length and of their direction of travel. Farther downstream with respect to the cutter 12, there is provided a cullet chute 14 and a breaker means 16. The operator of the cutter means 12, whenever an edge-vent defect is detected, operates the cutter means 12 so as to cut away the portion of the sheet containing such defect, so that, either naturally or by the means of the breaker means 16, the portion of the sheet containing the edge-vent defect is caused to fall into the cullet chute 14. Thus, only sheets of glass G that are substantially free of edge-vent defects are permitted to pass, as indicated by the arrow 8, to the polishing line.

Referring now with greater particularity to the edge-vent detector means 10, and referring in particular to FIG. 2, it will be seen that the means 10 comprises a base 18, having mounted thereon a pair of rods or rails 20, 22, upon which there is arranged a frame or carriage 24 that comprises a bearing 26 for a follower wheel 28, which rides in contact with the edge 30 of sheet of glass G. Spring means 32, 34 urge the frame 24 toward the edge 30. Mounted on the frame 24 is a microswitch 36, which may be such as that sold by the Atlas-Honeywell Regulator Co., Freeport, Ill. The microswitch 36 has an arm 38 which bears a wheel 40. As those skilled in the art will understand, the microswitch 36 has a construction such that the arm 38 is constantly urged outward, i.e., against the edge 30 of the sheet of glass G. Thus, when there comes into contact with the wheel 40 a defect in the edge 30, such as that indicated at 42, there is a change in the position of the arm 38, and the microswitch 36 then provides, through the line 44, a signal to the indicator means 46. The indicator means 46 may comprise an indicator light, horn, buzzer, or gong. In accordance with the invention, it is preferred that the conveyor 4 be provided with at least two of the units 10, one on each side of the sheets of glass G as they pass along said conveyor.

Those skilled in the art will understand that the frame or carriage 24 may be retracted manually as a sheet of glass G approaches, or if it is desirable, automatic means may be employed, such as a means upstream of the unit 10 for sensing the presence of glass, solenoid means responsive thereto for retracting the frame 24, and time-delay means for de-energizing the solenoid means to permit the frame 24 to be urged towards the glass G. Equivalent means may suggest themselves to those skilled in the art. It is helpful in many instances to cut away from the forward portions of the edge 30 of the glass G the portions that have not been inspected by the action of the equipment of the invention. The possibility of positioning the frame 24 appropriately so that such discarding of a forward portion of the glass G becomes unnecessary is also not to be ruled out.

We claim:

1. In apparatus for the production of ground-and-polished plate glass,
    means for conveying a sheet of glass along the substantially rectilinear path,
    means adjacent a lateral edge of said sheet of glass comprising a frame having operatively connected therewith a roller for following the position of said lateral edge,
    means for urging said frame toward said sheet of glass to maintain said roller in operative contact with said edge of said sheet of glass,
    microswitch means mounted on said frame and comprising means rollingly contacting said glass for sensing edge-vent defects therein, and
    indicator means operatively connected to said microswitch means, and
    cutter means for cutting away defects detected by said edge-vent detector means.

2. Apparatus as defined in claim 1, further characterized in that said apparatus comprises a cullet chute downstream of said cutter means.

3. Apparatus as defined in claim 2, characterized in that a breaker means is located above said cullet chute means.

4. In a process for the production of ground-and-polished plate glass, the steps of
    urging against a lateral edge of the as-ground but unpolished glass means rollingly in contact therewith to obtain an indication of the presence of edge-vent defects in said glass, and
    cutting away and removing from said as-ground but unpolished glass before the polishing of same the portions thereof containing said edge-vent defects.

5. A method as defined in claim 4, characterized in that said cutting away is performed with the use of mechanical means for scoring and snapping said glass transversely of its length.

6. A method as defined in claim 5, further characterized in that the cutting away and removing is done by using a cullet chute means downstream of the cutter means and a breaker means operatively associated therewith.

* * * * *